United States Patent [19]

Kamiyama et al.

[11] Patent Number: 5,383,713
[45] Date of Patent: Jan. 24, 1995

[54] INFLATABLE SEAT BELT APPARATUS

[75] Inventors: Misao Kamiyama; Kazuo Zeze, both of Hikone, Japan

[73] Assignee: Takata Corporation, Tokyo, Japan

[21] Appl. No.: 963,334

[22] Filed: Oct. 19, 1992

[30] Foreign Application Priority Data

Oct. 21, 1991 [JP] Japan .................. 3-272599

[51] Int. Cl.[6] .............................................. B60R 22/28
[52] U.S. Cl. ....................................... 297/471; 297/483
[58] Field of Search ............... 297/483, 464, 468, 470, 297/471, 472; 280/733

[56] References Cited

U.S. PATENT DOCUMENTS

| 3,865,398 | 2/1975 | Woll | 297/471 X |
| 3,866,940 | 2/1975 | Lewis | 280/733 |
| 4,348,037 | 9/1982 | Law et al. | 280/733 |
| 5,054,815 | 10/1991 | Gavagan | 297/483 X |

FOREIGN PATENT DOCUMENTS 2361069 6/1974 Germany .................. 297/471

Primary Examiner—Peter R. Brown
Assistant Examiner—Milton Nelson, Jr.
Attorney, Agent, or Firm—Armstrong, Westrman, Hattori, McLeland & Naughton

[57] ABSTRACT

Disclosed is an inflatable seat belt apparatus in which, under ordinary conditions, a bag-shaped belt (2b) of a shoulder belt (2) and a lap belt (3) are maintained in a belt-shaped form and a control member (5d) for controlling the opening area of a through-hole is maintained at an opening-area reducing position. Accordingly, the two belts (2b), (3) are prevented from turning over and twisting so that the seat belt apparatus (1) performs a function similar to that of the conventional seat belt apparatus. In the event of an emergency such as a vehicular collision, a gas generator (8) is actuated and generates a gas which causes the lap belt (3) to inflate. The gas which has filled the lap belt (3) causes the control member (5d) to move to the position at which it enlarges the opening area of the through-hole. Accordingly, the gas easily flows into the bag-shaped belt (2b) of the shoulder belt (2) ahead of a tongue (5). Thus, the bag-shaped belt (2) and lap belt (3) expand instantaneously and in a reliable fashion.

4 Claims, 4 Drawing Sheets

INFLATABLE SEAT BELT APPARATUS

BACKGROUND OF THE INVENTION

This invention relates to an inflatable seat belt apparatus having a webbing at least a portion of which is formed into a bag-shape, wherein the webbing is maintained in a belt-shape form during ordinary conditions and is inflated by gas from gas generating means at the time of an emergency.

The seat of a vehicle such as an automobile often is equipped with a seat belt apparatus. The seat belt apparatus is adapted to restrain a seated passenger by a webbing in the event of an emergency such as a vehicular collision, thereby protecting the passenger against injury caused by a collision. However, in a seat belt apparatus of this kind, the width of the webbing constituting a belt which restrains the passenger cannot be made very large, and, therefore a comparatively large load acts upon the passenger locally when the passenger is restrained by the webbing.

In efforts to solve this problem, inflatable seat belt apparatus have been proposed, as disclosed in the specifications of Japanese Patent Application Laid-Open (KOKAI) Nos. 47-26830 and 49-88220, in which the webbing is formed into the shape of a bag and functions as an ordinary seat belt by being maintained in a belt-shape form under ordinary circumstances. In the event of an emergency, a gas emitted from gas generating means is introduced into the bag-shaped webbing, thereby inflating the webbing so that the passenger is restrained by the inflated webbing, In accordance with an inflatable seat belt apparatus of this kind, the webbing receives the kinetic energy of the passenger over a wider area. Since the load is thus dispersed, the load which acts upon the passenger becomes comparatively small and the passenger is protected much more effectively.

When it is attempted to furnish a rear seat with an air bag apparatus of the kind provided in order to protect a passenger in the front seat, the air bag apparatus can only be installed in the front of the rear seat. In a case where an air bag apparatus is provided in the front seat, it is difficult to so arrange it that the air bag apparatus in the rear seat will protect the rear passenger properly and effectively since the position of the front seat differs depending upon whether it is moved forward or backward by the passenger, and since the reclining position of the front seat also differs depending upon the passenger. Accordingly, the above-described inflatable seat belt apparatus is particularly useful in the rear seat.

The conventional common seat belt apparatus comes in various configurations, one of which is a three-point seat belt configuration. In a three-point seat belt apparatus, a webbing wound upon a retractor is passed through a hole in a tongue, whereby the tongue is provided on the webbing in a freely slidable manner. When the seat belt is fastened, the tongue is inserted into and locked with a buckle fixedly connected to the floor of the vehicle body, whereby the webbing engages the shoulder of the passenger and protects the passenger from the left and right sides.

If the webbing becomes twisted in the tongue of this seat belt apparatus, not only is it impossible to apply the webbing correctly but smooth movement of the tongue along the webbing is impeded as well. Accordingly, it is required that the webbing hole formed in the tongue be designed to have a size that will not allow the webbing to become twisted. This means that there is a limitation upon the size of the hole and that the hole cannot be made very large.

However, if there is a limitation upon the size of the belt hole in the tongue, the inflation of the webbing is restricted by the tongue when the webbing is inflated by inflow of a gas to the bag-shaped webbing from the gas generating means in the event of an emergency. As a result, the injected gas cannot flow into the webbing smoothly from the location of the tongue, namely into the portion of the webbing in contact with the passenger. As a result, there are instances in which the portion of the webbing contacting the passenger is not inflated rapidly. Accordingly, a case is conceivable in which it is impossible to reliably and fully realize the inflatable seat belt function of reducing the load upon the passenger by having the webbing disperse the load attributable to the kinetic energy of the passenger.

SUMMARY OF THE INVENTION

Accordingly, an object of the present invention is to provide an inflatable seat belt apparatus in which the inflatable webbing can be inflated reliably and rapidly at the time of an emergency even if the webbing is provided with a movable tongue.

According to the present invention, the foregoing object is attained by providing an inflatable seat belt apparatus having a webbing at least part of a portion which comes into contact with a passenger and is formed into a bag-shape shape, wherein the webbing is maintained in a belt-shape form during ordinary conditions and the bag-shape portion is inflated by gas from a gas generating means at the time of an emergency, and a tongue provided on the webbing is inserted into and locked with a buckle to make possible restraint of the passenger, characterized in that the tongue is provided with a through-hole through which the webbing is free to pass, a through-hole opening-area control member being movably provided on the tongue and held at an opening-area reducing position under ordinary conditions and moved to an opening-area enlarging position in the event of an emergency, wherein when the control member is at the opening-area reducing position it sets the opening area of the through hole to a size which will allow movement of the webbing therethrough while the webbing is maintained in the belt-shape form, but which will impede turning over and twisting of the webbing, and when the control member is at the opening-area enlarging position it enlarges the opening area of the through-hole.

In the inflatable seat belt apparatus according to the invention constructed as set forth above, under ordinary conditions the webbing is maintained in the belt-shape form and the through-hole opening-area control member reduces the opening area of the through-hole. Accordingly, the webbing is prevented from twisting and turning over in the through-hole of the tongue, and the inflatable seat belt apparatus performs a function similar to that of the common seat belt apparatus of the prior art.

In the event of an emergency, the gas generated by the gas generating means is impelled into the bag-shaped portion of the webbing. At this time, the control member is moved to the opening-area enlarging position, and, therefore, the opening area of the tongue through-hole is enlarged. As a result, the gas can readily penetrate the bag-shaped portion of the webbing. Accordingly, the webbing is inflated instantaneously and in a reliable fashion so that the passenger is reliably restrained by the inflated webbing. Consequently, the restraining portion of the webbing that acts upon the passenger broadens so that the kinetic energy of the passenger is received over a wide area. This means that the load is dispersed so that the passenger is protected from large impact loads much more reliably. Moreover, owing to the fact that the webbing expands, slackness in the webbing is taken up to improve even further the passenger restraining capability of the inflatable seat belt apparatus.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENTS

Figure 1:
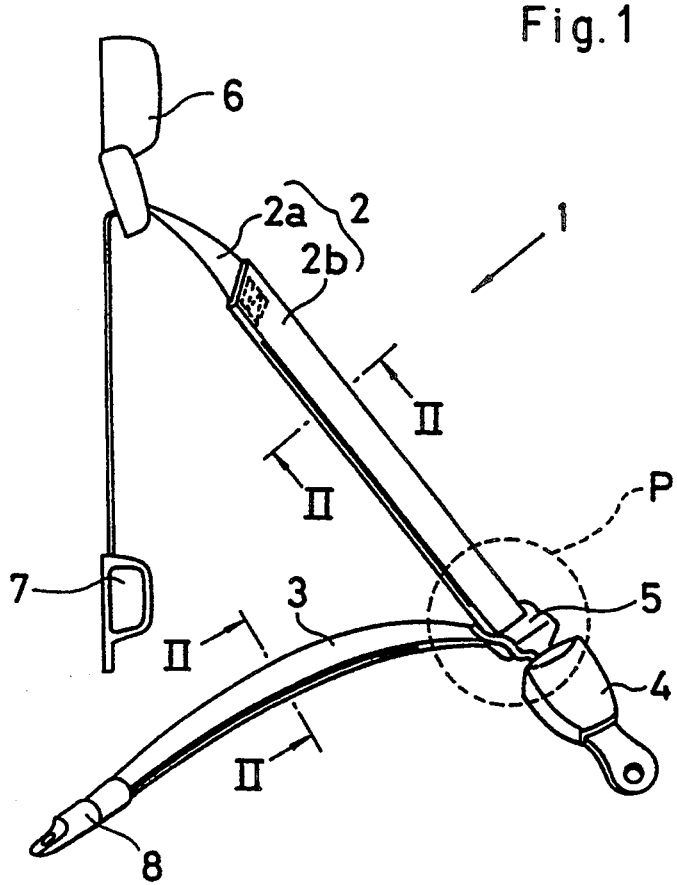
FIG. 1 is a schematic view showing the overall construction of an inflatable seat belt apparatus according to a first embodiment of the present invention.

As shown in FIG. 1, an inflatable seat belt apparatus 1 according to this embodiment includes a shoulder belt 2 extending from a left or right side (the right side of the passenger in the illustrated example), a lap belt 3 formed to be continuous with the shoulder belt 2, a buckle device 4 fastened to the floor of the vehicle body, a tongue 5 inserted into and locked with the buckle device 4 when the seat belt is fastened, and an intermediate guide 6 which guides the shoulder belt 2.

The shoulder belt 2 is composed of a normal belt 2a similar to the common seat belt of the prior art, and a bag-shaped belt 2b one end of which is connected to one end of the normal belt 2a. The normal belt 2a is slidably guided by the intermediate guide 6 and has its other end connected to a seat belt retractor (ELR) 7 secured to the vehicle body. A prescribed amount of the normal belt 2a is wound up by the seat belt retractor 7.

The lap belt 3 is a unitary member formed into a bag-shape integrated with the bag-shaped belt 2b of the shoulder belt 2. Connected to an end portion of the lap belt 3 is a gas generator (G.G.) 8 actuated in the event of an emergency such as a vehicular collision to generate a reaction gas introduced to the interior of the bag-shaped belts 3, 2b.

Figure 2:
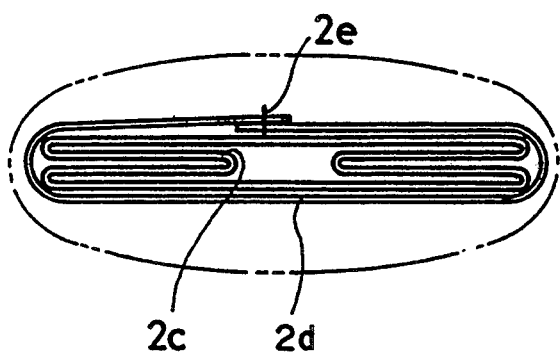
FIG. 2 is a sectional view taken along line II—II of FIG. 1.

As indicated by the solid lines in FIG. 2, the bag-shaped belts 2b, 3 each have a bag-shaped belt main body 2c folded up and covered as by a cover 2d, both ends of which are sewn together at 2e, whereby the belt-shaped form is maintained when ordinary conditions prevail. The cover 2d is so designed that when the reaction gas is introduced from the gas generator 8, the sewn portion 2e readily separates under the expansion force of the shoulder belt 2 and does not interfere with the inflation of the shoulder belt 2. At this time the shoulder belt 2 reliably expands as indicated by the two-dot chain line in FIG. 2. The portion at which the normal belt 2a and bag-shaped belt 2b of shoulder belt 2 are connected and the connection between the lap belt 3 and gas generator 8 are maintained in an air-tight state.

Figure 3:
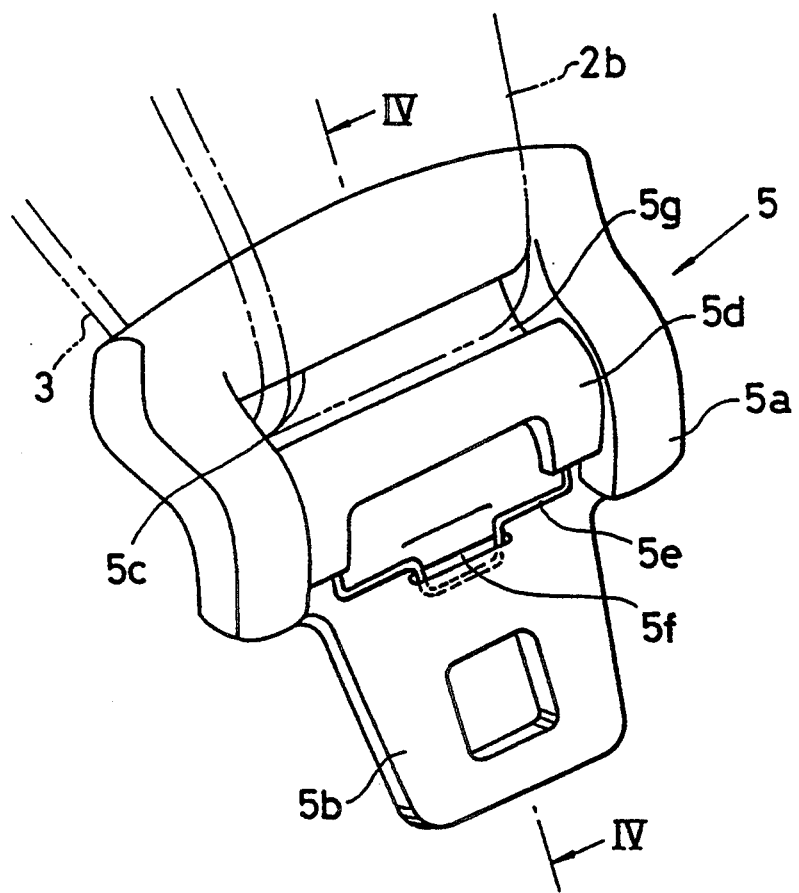
FIG. 3 is a perspective view of a tongue according to the first embodiment, in which a portion P in FIG. 1 is shown in enlarged form.

The tongue 5 is provided so as to slide freely along the belts 2b, 3 formed into the bag-shape. As illustrated in FIG. 3, the tongue 5 has a main body 5a provided with a locking portion 5b to be fitted into and locked with the buckle device 4, and with a through-hole 5c through which the bag-shaped belts 2b, 3 pass in a freely movable manner. The size of the through-hole 5c is set to allow sufficient expansion of the belts 2b, 3, as indicated by the two-dot chain line in FIG. 2.

Figure 4C:
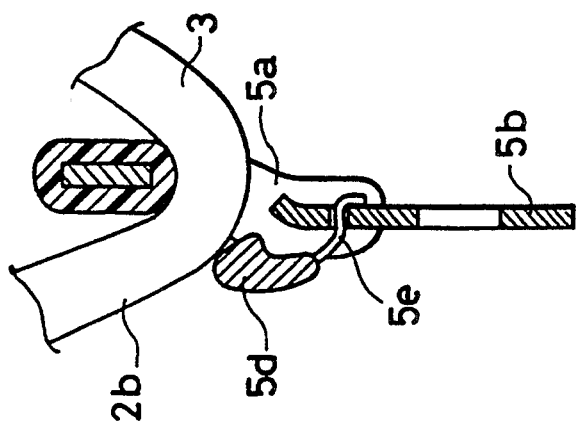
FIGS. 4(a), 4(b), and 4(c) diagrammatically illustrate the operation of this embodiment.

A through-hole opening-area control member 5d is turnably and resiliently attached to the main body 5a. More specifically, both ends of a spring 5e comprising a resilient wire are connected to the control member 5d, and the mid-portion of the spring 5e is fitted into a hole 5f provided in the main body 5a. As shown in FIG. 4 (a), the control member 5d is constantly biased by the spring 5e in a direction which brings it into contact with the main body 5a since the spring 5e is fitted into the hole 5f to attach the control member 5d to the main body 5a. Under ordinary conditions, therefore, the control member 5d is maintained in a state in which it is in abutting contact with the main body 5a. The control member 5d is designed to have a size which will close part of the through-hole 5c when the control member is in abutting contact with the main body 5a, thereby reducing the opening area of the through-hole 5c.

Accordingly, by holding the control member 5d in the state in which it is in contact with the main body 5a under ordinary conditions, the opening area of the through-hole 5c ordinarily is minimal. The design is such that the opening area of an open portion 5g (FIG. 3) of the through-hole 5c at this time will allow smooth movement of the belts 2b, 3 through the hole 5c but will prevent the belts 2b, 3 from turning over or twisting.

Figure 4B:
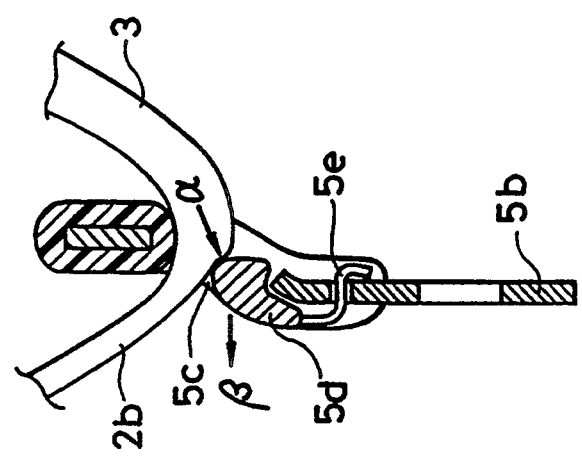

The spring 5e is so designed that the magnitude of the spring force thereof will allow the control member 5d to readily turn in the direction of arrow β [see FIG. 4(b)] under the expansion force in the folded portions of the belts 3, 2b when the reaction gas expelled from the gas generator 8 flows into the belt 3 and causes expansion of the folded portions of the belts 3, 2b.

Figure 4A:
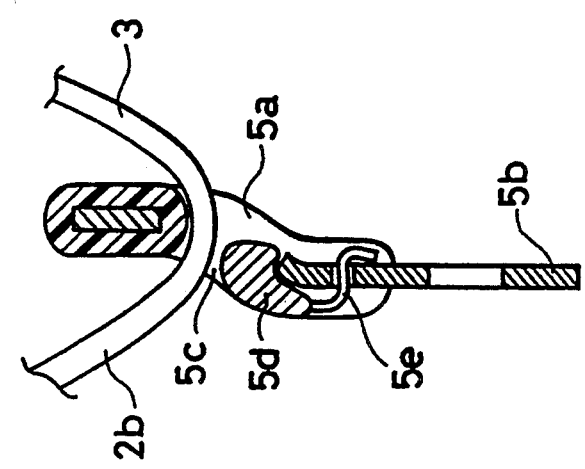

In the seat belt apparatus 1 of the embodiment constructed as described above, under ordinary conditions the belts 2b, 3 are maintained in the belt-shaped form and the through-hole opening-area control member 5d is held in the state in which it is in contact with the main body 5a, as shown in FIG. 4(a), thereby minimizing the opening area of the through-hole 5c. More specifically, the control member 5d is held at a position at which it reduces the opening area.

Under these conditions, the passenger sits down in the seat and inserts the tongue 5 into the buckle device 4 until it locks, thereby fastening the belt. With the belt fastened in this manner, the shoulder belt 2 and lap belt 3 are biased under a weak force in the take-up direction by means of the seat belt retractor 7, just as in an ordinary seat belt apparatus according to the prior art.

However, the weak force does not subject the passenger to an oppressive sensation. In addition, since the take-up reel of the seat belt retractor 7 does not lock, the two belts 2, 3 can be pulled out freely.

When deceleration of a predetermined magnitude acts upon the vehicle while the vehicle is traveling, the passenger moves forward owing to an inertial force and the two belts 2, 3 attempt to pull out of the seat belt retractor 7. However, a deceleration sensor provided in the seat belt retractor 7 is actuated at this time and causes the take-up reel to lock, as a result of which the belts 2, 3 are prevented from pulling out. Accordingly, the passenger is reliably restrained by the shoulder belt 2 and lap belt 3 and is prevented from being thrust forward. In this case the shoulder belt 2 contacts the passenger at the correct position owing to the intermediate guide 6. Thus, under ordinary conditions the inflatable seat belt apparatus 1 of this embodiment exhibits a passenger-restraining function similar to that of the ordinary seat belt apparatus according to the prior art.

In the event of an emergency when a very large deceleration acts upon the vehicle, as when a vehicular collision occurs, a deceleration sensor provided in the vehicle is actuated and causes the gas generator 8 to generate a high-pressure gas. As shown in FIG. 4 (b), the generated gas flows instantaneously into the lap belt 3, thereby dislodging the cover 2d and causing the lap belt 3 to inflate. The gas which has penetrated the lap belt 3 urges the control member 5d of the tongue 5 in the direction of arrow $\alpha$ via the portion of the belt that has been inflated. As a result, the control member 5d is turned in the direction of arrow $\beta$ against the biasing force of the spring 5e.

As shown in FIG. 4 (c), the control member 5d is moved to a position at which the opening area of the through-hole 5c is enlarged. At this position of the control member 5d, the opening area of the through-hole 5c is enlarged so that the gas may readily penetrate the bag-shaped belt 2b of the shoulder belt 2 from the tongue onward, namely the portion of the belt in contact with the passenger. Thus the bag-shaped portion 2b also expands substantially instantaneously and in reliable fashion.

Accordingly, the passenger is reliably restrained by the inflated bag-shaped belt 2b. As a result, the bag-shaped belt 2b broadens so that the kinetic energy of the passenger is borne over a wide area. The load, therefore, is dissipated so that the passenger is protected against large impact loads in a reliable manner. In addition, slack in the belts 2, 3 is taken up owing to the expansion of the bag-shaped belt, as a result of which the passenger-restraining performance of the belt is improved. Moreover, since the gas readily flows into bag-shaped belt 2b ahead of the tongue 5, the heat of the gas which acts upon the connecting portion between the lap belt 3 and the gas generator 8 is reduced.

Figure 5:
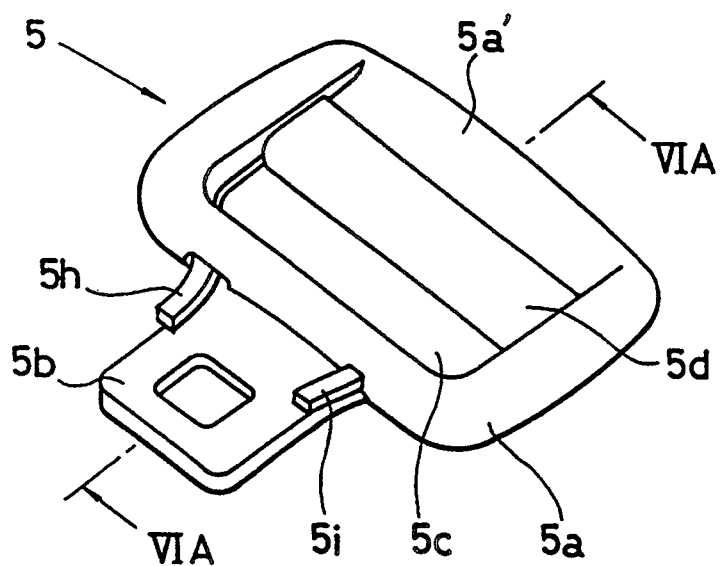
FIG. 5 is a perspective view showing a tongue according to another embodiment of the invention.

FIG. 5 illustrates another embodiment of the present invention. This is a perspective view of the buckle similar to that of FIG. 3. Elements identical with those of the first embodiment are designated by like reference characters and need not be described again.

Figure 6A:
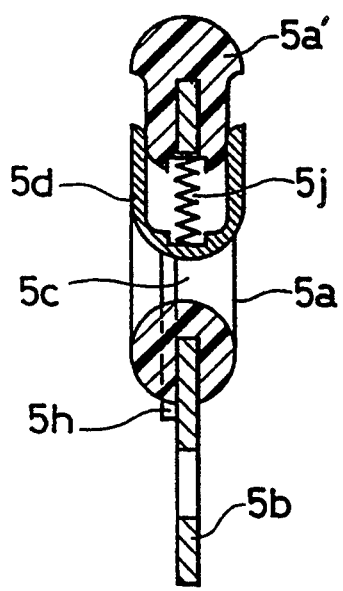
FIGS. 6(a) and 6(b) are sectional views taken along line VIA—VIA of FIG. 5 for describing the operation of this embodiment.

In this embodiment, as shown in FIGS. 5 and 6, the control member 5d is provided in the main body 5a of tongue 5 in such a manner as to be capable of sliding in the axial direction. More specifically, the control member 5d is formed to have a generally U-shaped cross section and is freely slidably fitted into a portion 5a' of the main body 5a. The control member 5d is provided with a pair of arm members 5h, 5i capable of being projected in the direction of the locking portion 5b from the main body 5a. Further, a spring 5j is compressed between the control member 5d and the portion 5a' of the main body 5a, as depicted in FIG. 6. In the state in which the tongue 5 is not yet engaged with the buckle device 4, the control member 5d is held by the biasing force of the spring 5j at the position at which it minimizes the opening area of the through-hole 5, as shown in FIG. 6(a). At this position of the control member 5d, the pair of arm members 5h, 5i are in a state in which they project from the main body 5a toward the locking portion 5b to the maximum extent.

Figure 6B:
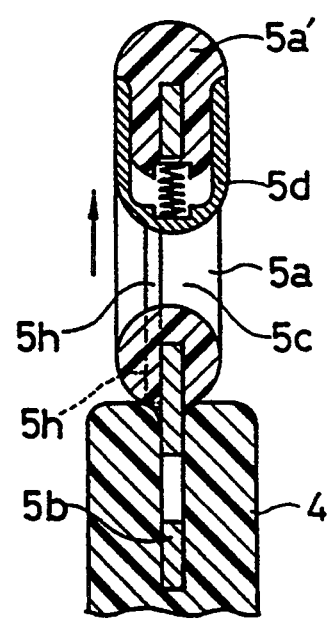

When the tongue 5 is inserted into and locked with the buckle device 5 in order to fasten the seat belt, the buckle device 4 presses against the pair of arm members 5h, 5i, as illustrated in FIG. 6(b), and, therefore, the control member 5d is slid toward the portion 5a' of main body 5a against the biasing force of the spring 5j. As a consequence, the control member 5d is set at the position where it maximizes the opening area of the through-hole 5c.

In accordance with this embodiment of the invention, the opening area of the through-hole 5c is set to be small to prevent the webbing from turning over and twisting when the tongue 5 is not engaged with the buckle device 4, in which case gas generated by the generator 8 is not a factor. When the tongue 5 has been engaged with the buckle device 4, the opening area of the through-hole 5c is set to be large so that the gas is capable of flowing smoothly and easily when generated. The other elements of the inflatable seat belt apparatus of this embodiment are identical with those of the first embodiment described earlier.

Thus, in accordance with the inflatable seat belt apparatus of the present invention, as described in detail above, the opening area of the through-hole is made small under ordinary conditions, thereby making it possible to reliably prevent the webbing from turning over and twisting. Thus, when conditions are normal, the inflatable seat belt apparatus performs a function similar to that of the common seat belt apparatus of the prior art.

In the event of an emergency, the opening area of the tongue through-hole is enlarged so that the gas can readily penetrate the bag-shaped portion of the webbing. Therefore, even though the webbing is folded at the tongue, the webbing can be inflated instantaneously and in reliable fashion. Accordingly, the kinetic energy of the passenger is borne over a wide area so that the passenger is protected from large impact loads much more reliably. Moreover, owing to the fact that the webbing expands, slackness in the webbing can be absorbed to improve even further the passenger restraining performance of the inflatable seat belt apparatus.

As many apparently widely different embodiments of the present invention can be made without departing from the spirit and scope thereof, it is to be understood that the invention is not limited to the specific embodiments thereof except as defined in the appended claims.

What is claimed is:

1. An inflatable seat belt apparatus, comprising:
   a webbing, at least part of a portion of said webbing comes into contact with a passenger and is formed into a bag-shape, wherein the webbing is maintained in a belt-shape form during ordinary conditions and the bag-shape portion is inflatable by gas from a gas generating means at the time of an emergency;

a tongue provided on said webbing which is insertable into and lockable with a buckle to enable restraint of the passenger;

said tongue being provided with a through-hole through which said webbing is free to move;

a through-hole opening-area control member being movably provided on said tongue and being movable between an opening-area reducing position and an opening area enlarging position, said control member being capable of being held at said opening-area reducing position under initial conditions and being capable of being moved to said opening-area enlarging position, so as to be in said opening-area enlarging position in the event of a necessity;

wherein when said control member is at said opening-area reducing position, an opening area of the through-hole is defined at least in part by said control member to be a first size which will allow movement of said webbing therethrough while said webbing is maintained in the belt-shape form, but which will impede turning over and twisting of said webbing, and when said control member is at said opening area enlarging position, said opening area of the through-hole is defined at least in part by said control member to be a second size which is larger than said first size.

2. The apparatus according to claim 1, wherein said control member is biased toward said opening-area reducing position by a spring at all times.

3. The apparatus according to claim 2, wherein said control member has arm members;

said control member being set at the opening-area reducing position by said spring when the tongue is not inserted into said buckle;

said buckle pressing against said arm members when the tongue is inserted into said buckle, whereby said control member is set at said opening-area enlarging position.

4. An inflatable seat belt apparatus, comprising:

a webbing, at least part of a portion of said webbing comes into contact with a passenger and is formed into a bag-shape, wherein the webbing is maintained in a belt-shape form during ordinary conditions and the bag-shape portion is inflated by gas from a gas generating means at the time of an emergency;

a tongue provided on said webbing which is insertable into and lockable with a buckle to enable restraint of the passenger;

said tongue being provided with a through-hole through which said webbing is free to move;

a through-hole opening-area control member movably provided on said tongue;

means for holding said control member at an opening-area reducing position under initial conditions and for moving said control member to an opening-area enlarging position, so as to be in said opening-area enlarging position in the event of an emergency;

wherein when said control member is at said opening-area reducing position, an opening area of the through-hole is defined at least in part by said control member to be a first size which will allow movement of said webbing therethrough while said webbing is maintained in the belt-shape form, but which will impede turning over and twisting of said webbing, and when said control member is at said opening area enlarging position, said opening area of the through-hole is defined at least in part by said control member to be a second size which is larger than said first size.

* * * * *